K. FUCHS.
PRISM FOR HEMOGLOBINOMETERS.
APPLICATION FILED MAY 19, 1921.

1,429,072.

Patented Sept. 12, 1922.
2 SHEETS—SHEET 1.

INVENTOR
Karl Fuchs
By W. W. Williamson
Atty.

K. FUCHS.
PRISM FOR HEMOGLOBINOMETERS.
APPLICATION FILED MAY 19, 1921.
1,429,072.
Patented Sept. 12, 1922.
2 SHEETS—SHEET 2.
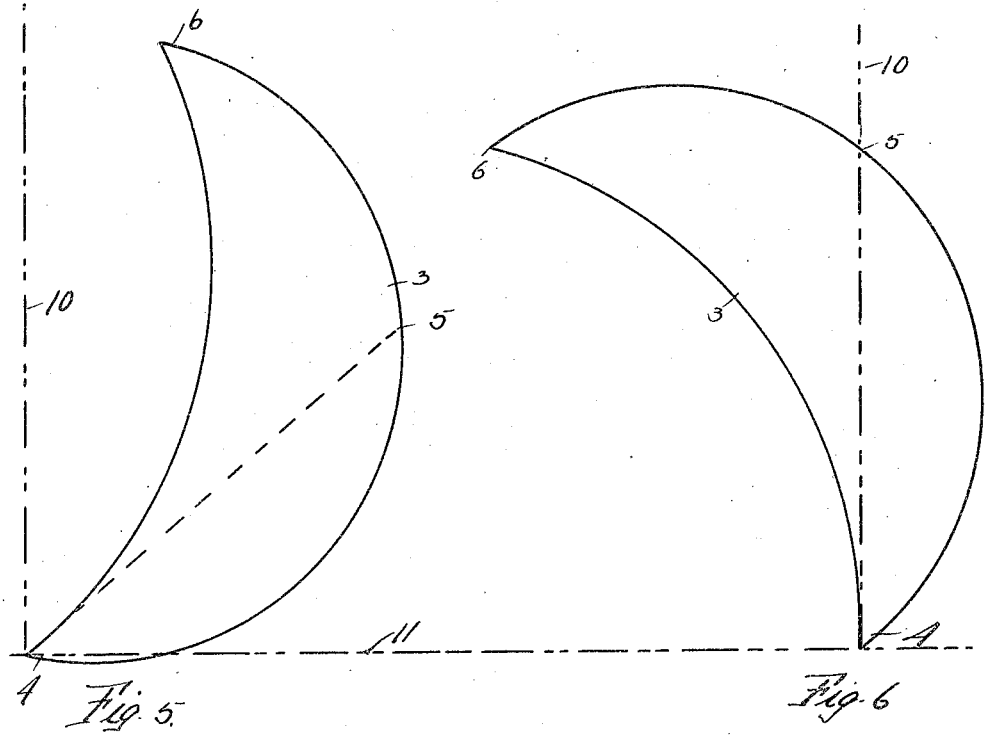
Fig. 5.    Fig. 6.
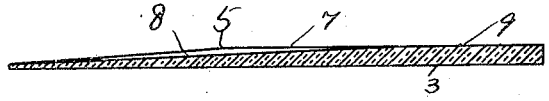
Fig. 7.
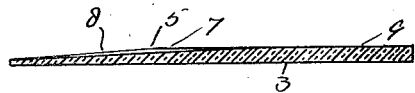
Fig. 8.
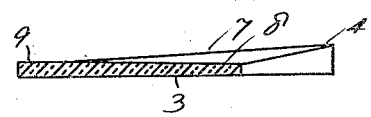
Fig. 9.
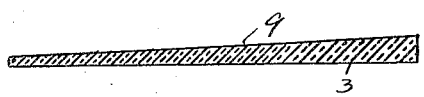
Fig. 11.    Fig. 10.
INVENTOR
Karl Fuchs
By W. W. Williamson Atty.

Patented Sept. 12, 1922.

1,429,072

UNITED STATES PATENT OFFICE.

KARL FUCHS, OF ATCO, NEW JERSEY.

PRISM FOR HEMOGLOBINOMETERS.

Application filed May 19, 1921. Serial No. 470,867.

*To all whom it may concern:*

Be it known that I, KARL FUCHS, a citizen of the United States, residing at Atco, in the county of Camden and State of New Jersey, have invented new and useful Improvements in a Prism for Hemoglobinometers, of which the following is a specification.

My invention relates to new and useful improvements in a prism for hemoglobinometers, and has for its primary or principal object to improve the construction of such a prism whereby more uniform results are obtainable.

Another object of the invention is to provide a crescent shaped prism of this character having an arcuate or curved line of sight which may be produced from a single piece of glass.

A further object of the invention is to provide a new method of producing or manufacturing such a prism.

A still further object of the invention is to construct a prism having a portion of one of its faces beveled or inclined in one direction and another portion beveled in another direction to produce an evenly graded and accurately proportioned incline from one end to the other of the line of sight thereby obtaining all the advantages of a straight prism in one of angular form.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 5, is a face view of the prism illustrating the position at which it is set for the first grinding operation.

Fig. 6, is a similar view showing the other position at which it is set for the second grinding operation.

Fig. 7, is a section at the line 7—7 of Fig. 1.

Fig. 8, is a section at the line 8—8 of Fig. 1.

Fig. 9, is a section at the line 9—9 of Fig. 1.

Fig. 10, is a section at the line 10—10 of Fig. 1.

Fig. 11, is a section at the line 11—11 of Fig. 1.

Figure 1:
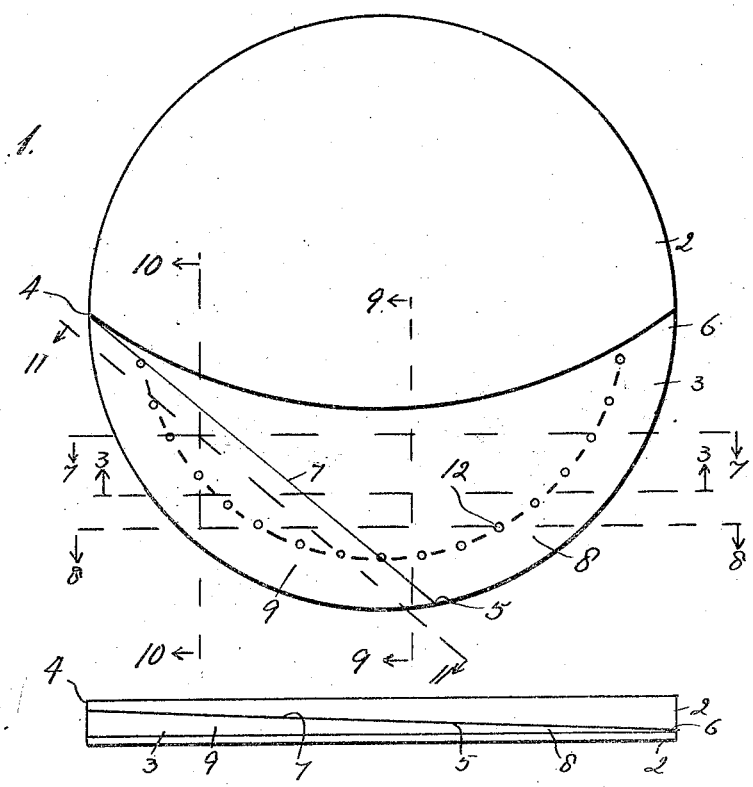
Fig. 1, is a face view of a complete hemoglobinometer test glass including a prism embodying my invention.
Figure 2:
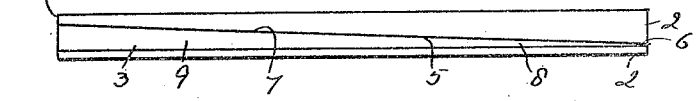
Fig. 2, is an edge view thereof.
Figure 3:
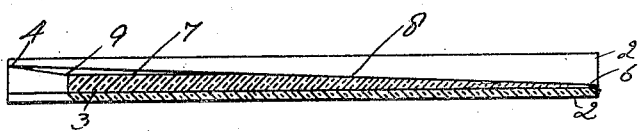
Fig. 3, is a section at the line 3—3 of Fig. 1.
Figure 4:
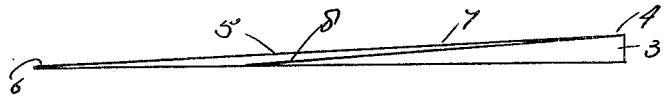
Fig. 4, is an inner edge view of the prism.

In carrying out my invention as here embodied, 2 represents a disc of porcelain or other similar translucent substance which is partially cut away or recessed to receive the crescent shaped prism 3 preferably of ruby glass, said prism being of one integral piece secured in some suitable manner to the recessed portion of the disc the latter adapted to be rotatably mounted in a hemoglobinometer of present day construction.

The prism decreases from the point 4 to approximately one-half its thickness at the point 5 to a knife edge at the point 6 and also decreases in thickness from the line of demarcation represented by the numeral 7 between the primary prism 8 and a secondary prism 9 and from the outer edge of the primary prism 8 toward the inner or convex edge of the prism while the secondary prism decreases in thickness from the point 4 to the point 5 but the upper, lower or inner and outer faces of said secondary prism are parallel to each other at any section through said secondary prism taken at right angles to the line of demarkation 7.

To produce a prism of the form herein described I temporarily cement the prism glass 3 and a piece of glass or any other suitable object for use as a backing or holding means so that the two points 4 and 6 are in a perpendicular line represented by the numeral 10 which is at right angles to a base line 11. One end or point of the prism glass, as 6, is then moved away from the perpendicular line with the opposite end or point 4 stationary relative to both the perpendicular and base lines as plainly shown in Fig. 5. The position of the prism glass relative to the perpendicular and base lines is then such that when ground on a line parallel with the perpendicular line which will give to the prism glass a beveled face decreasing in thickness from a certain required or previously established thickness at the point 4 to the point 6 where it will be approximately knife edged while the point 5 on the outer edge of the prism glass will be approximately one-half the thickness of the point 4 and because of the position of the prism during the grinding operation the inner or concaved edge will be thinner than any point on the outer edge that is on a line parallel with the base line 11.

After this first grinding operation has been completed the prism glass is moved until the point 5 is on the opposite side of the perpendicular line 10 and the points 4 and 5 coincide with said perpendicular line. The prism glass is then ground on an incline away from the base line parallel with the perpendicular line so that a secondary beveled face is produced decreasing in thickness from the point 4 to the point 5 leaving the aforementioned line of demarcation 7 and along which line both the primary and secondary prism are of the same thickness and although said secondary prism decreases in thickness from the point 4 to the point 5 in the same ratio as the primary prism decreases in thickness from the point 5 to the point 6, any point on the convex or outer edge of the prism between the points 4 and 5 on line with a point on the line of demarcation parallel with the base line 11 will be in a horizontal plane or said secondary prism will be of the same thickness the entire length of said line.

After the prism is formed from the prism glass by the method herein described said prism is removed from the backer or holding means and is then secured to the disc 2 to produce a completed test glass as shown in Fig. 1 wherein the arcuate line or circles and dashes denoted by the reference numeral 12 represents the line of sight and by reference to Figs. 7 and 8 it will be noted that the different points in the primary and secondary prisms have a gradual predetermined decrease in thickness along said line of sight from the thick to the thin end of the prism and this same ratio of decreasing thickness is maintained in the secondary prism along of sight as plainly shown in Figs. 9, 10 and 11.

Heretofore it has been customary to produce such prisms in two or more pieces and up to the present time it has been practically impossible to produce a curved prism for hemoglobinometers from a single piece of glass and although I had produced such a glass as shown in my application Serial Number 387,389, dated June 8th, 1920 and of which this application is a continuation, I have found that the change in thickness of the prism from the point 4 to approximately the point 5 is not great enough to give the most accurate readings or of sufficient expanse to produce the same ratio of decrease in thickness in that portion of the prism adjacent the thicker end as that portion of the prism toward the thinner end. I have overcome these disadvantages with the prism herein described by producing the secondary prism on a different angle from that of the primary prism so that said decrease in thickness throughout the secondary prism along its line of sight is of the same ratio as that of the primary prism along its line of sight and therefore the rotation of the prism a given number of degrees in the line of sight in either the primary or secondary prisms the ratio of decrease or increase will be identical.

Of course I do not wish to be limited to the exact details of construction as herein shown as these may be varied within the limits of the appended claims without departing from the spirit of my invention.

Having thus fully described my invention, what I claim as new and useful is:—

1. A prism for hemoglobinometers including a primary prism portion and a secondary prism portion separated by a line of demarcation, the primary prism portion increasing in thickness from a knife edge toward said line of demarcation and the secondary prism portion increasing in thickness in parallelism with said line of demarcation.

2. A prism for hemoglobinometers including a primary prism portion and a secondary prism portion separated by a line of demarcation, the primary prism portion increasing in thickness from a knife edge toward said line of demarcation and along said line of demarcation, the secondary prism portion increasing in thickness in parallelism with said line of demarcation, the opposite faces of the secondary prism portion, in any section thereof at right angles to the line of demarcation, being parallel.

3. A prism for hemoglobinometers including a primary prism portion and a secondary prism portion separated by a line of demarcation, the secondary prism portion decreasing in thickness from one end toward the other in parallelism with the line of demarcation, the primary prism portion decreasing in thickness along said line of demarcation the same as the secondary prism portion and from said line of demarcation toward one side and the end of said primary prism portion.

4. A prism of the class mentioned including a primary prism portion and a secondary prism portion separated by a line of demarcation, the secondary prism portion having its line of decrease parallel with the line of demarcation and the primary prism having its line of decrease at an angle to said line of demarcation.

5. A prism of the class mentioned including a primary prism portion and a secondary prism portion separated by a line of demarcation, the secondary prism portion having its line of decrease parallel with the line of demarcation and the primary prism having its line of decrease at an angle of more than forty-five degrees to said line of demarcation.

In testimony whereof, I have hereunto affixed my signature.

KARL FUCHS.